UNITED STATES PATENT OFFICE.

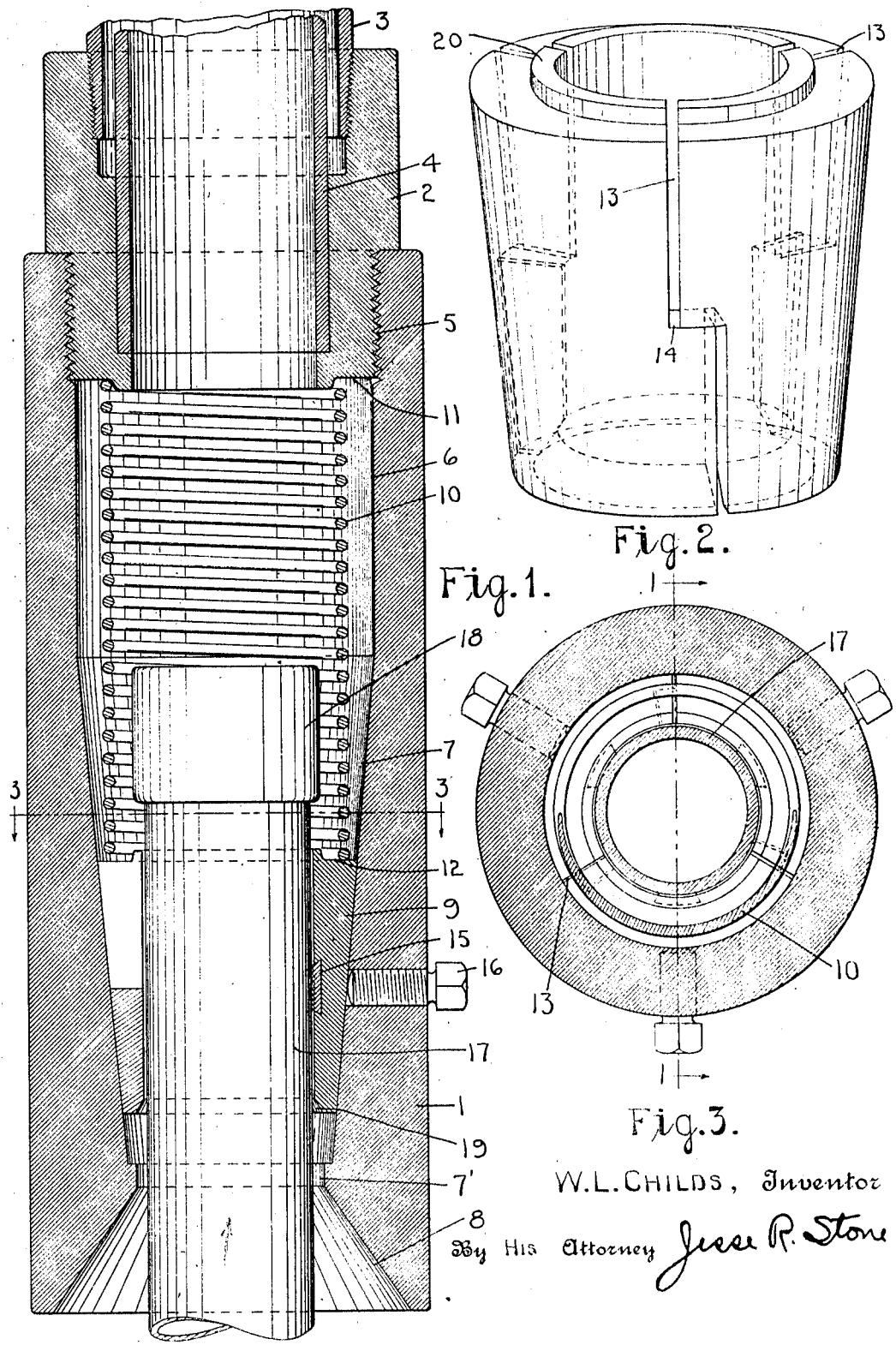

WILLIAM L. CHILDS, OF HOUSTON, TEXAS, ASSIGNOR TO HUGHES TOOL COMPANY, OF HOUSTON, TEXAS, A CORPORATION OF TEXAS.

AUTOMATIC PIPE-COUPLING.

1,314,787.   Specification of Letters Patent.   Patented Sept. 2, 1919.

Application filed December 16, 1918. Serial No. 266,907.

*To all whom it may concern:*

Be it known that I, WILLIAM L. CHILDS, a citizen of the United States, residing at Houston, Harris county, Texas, have invented a certain new and useful Automatic Pipe-Coupling, of which the following is a full, clear, and exact description, such as will enable others skilled in the art to which it appertains to make and use the same.

My invention relates to improvements in automatic pipe couplings for especial use in making connections between pipes through one of which a fluid is issuing under pressure.

This type of coupling is capable of wide use but the invention has particular application to connecting up an oil, gas, or other similar well that is flowing wild, with a system of valve-controlled pipes so that the flowing fluid may be controlled and used. It not infrequently happens that oil or gas wells, when they are first completed, will come in with great force. The subterranean pressure is so great that the fluid gushes forth carrying with it the upper pipe connections as well as parts of the derrick and drilling apparatus. The flow is so strong that it is extremely difficult with the apparatus now in use to control the flow and save the material.

In my invention I contemplate preparing a series of pipes controlled by valves so that the oil or gas may be directed to any point desired when the same is connected to the pipe in the flowing well. At the lower end of this pipe I fix my automatic coupling. This coupling is then held firmly and inserted forcibly over the end of the pipe from which the flow is coming and the connection is thus made.

An object of my invention is to provide a coupling means for pipes which may be used where a connection between two sections of pipe is difficult to make on account of the gushing fluid and which will automatically close itself to make a tight joint and prevent leakage. Other objects and advantages will be apparent from the more detailed description which follows and will be set forth with greater particularity in the claims.

Referring to the drawings forming a part of this specification and wherein like numerals are applied to like parts throughout the several views, Figure 1 is a central longitudinal section through a coupling means embodying my invention. Fig. 2 is a perspective view of an automatic clamping means used therein and Fig. 3 is a transverse section taken on the line 3—3 of Fig. 1.

In Fig. 1 I have shown a coupling means for use in the manner described, consisting of an outer sleeve 1, adapted to be interiorly threaded at its upper end, as at 5, for attachment to a connecting joint 2, by means of which the coupling member is connected to the system of pipes, the lower end of which is shown at 3. As illustrated in Fig. 1, the coupling sleeve 1, has a cylindrical upper chamber 6, extending approximately one-third the length of said coupling and a connecting tapered portion 7, which is narrowed toward the lower end to provide an opening at 7' of sufficient diameter to receive the upper end of the well pipe. From this opening 7' downward to the lower end of the coupling 1, the central chamber is flared outwardly to provide a recess 8 to receive the upper end of the well pipe and to direct it into the opening 7' to the interior of the coupling.

Within the tapered portion 7 of the interior chamber of the coupling, I have provided a longitudinally slidable clamping sleeve 9 somewhat wedge shaped in cross-section with the smaller end downward. This clamping sleeve is divided longitudinally into three sections. It is apparent, however, that it may be divided into as many sections as desired and I do not wish to confine myself to dividing the same into three parts. The line of division 13 between the several sections is offset at a point intermediate the ends of the clamping sleeve as at 14 for an obvious purpose. By means of this provision it is possible to prevent leakage longitudinally of the coupling when the parts thereof are expanded. The sections may be separated slightly along the longitudinal lines of separation, but the horizontal portions 14 will still contact firmly and prevent the passage of liquid through the space 13 between the parts. The upper ends of the sections composing the clamping sleeve 9 are provided with an outwardly projecting flange 20 so as to provide, outside thereof, a seat for a spiral spring 10. The lower end of the connecting joint 2 is provided with a similar seat to receive the upper end of the spring 10, thereby limiting the movement of the upper end of the said spring. As will be noted, the clamping sleeve 9 is tapered in thickness from the upper end downwardly to fit closely within the chamber 7. It is obvious that the said sleeve may be forced upwardly against the action of the spring 10, but that when the said sleeve is free to move downwardly it will be forced in that direction by the expansion of the spring 10. It is contemplated that the clamping sleeve 9 shall be made of a soft metal such as lead in order that the sleeve may be jammed firmly into contact with the pipe which is to be received therein. If desired a portion of the inner face of the said sleeve may be provided with toothed jaws 15 of some hard metal such as steel in order to more firmly grip the well pipe 17 to which it is to be coupled. A radial set screw 16 is provided through the coupling member 1, each of said screws being adapted to compress one of these sections of the clamping sleeve 9 firmly into contact with the well pipe received therein.

I have shown within the upper coupling member 2 an inner pipe 4 received therein. This pipe 4 may be dispensed with if desired and, if used, will serve the purpose of furnishing a removable pipe, within the outlet pipe 3 and the gate valves therein, which will provide an outlet for the first oil or gas from the gushing well. As this oil or gas is customarily accompanied by large quantities of sand and other sediment it will sometimes clog the valves or so wear the same that they have to be quickly replaced. By using an inner removable pipe such as 4, the wear of the sand which is projected outwardly with the gushing oil or gas, may be entirely taken up by this pipe and when the bulk of the sand and grit has escaped this pipe may be removed. And when removed, the valves in the pipe 3 may be closed and the oil or gas directed as desired.

The operation of my device will now be apparent. The pipe 3 to which my automatic coupler 1 is attached is arranged and adjusted so as to accommodate a strong flow of fluid and my coupling member secured in place on the lower end thereof. The upper end 17 of the pipe from which the gushing oil or gas is proceeding has usually on the upper end thereof a pipe coupling or connection 18. If it were adapted to thread a common length of pipe into this coupling member 18, it would ordinarily be found impossible to make such connection. My coupling can be used to make such a connection automatically. The lower portion is thrust over the upper end of the pipe 17 and jammed forcibly downward. The upper end 18 of the pipe will be directed through the opening 7' in the lower end of my coupling means and will strike the lower beveled face 19 of the coupling sleeve 9. This sleeve will be forced upwardly by the pipe 17 against the action of the spring 10. When this sleeve has been forced upwardly so as to provide sufficient expansion to allow the pipe to pass therethrough, the spring will force the sections of the sleeve downwardly again, wedging the sleeve between the beveled portion 7 of the member 1 and the outer cylindrical portion of the pipe 17, thus closing the lower end of the coupling. It is obvious that the pressure exerted by the flow within the chamber 6 will only reinforce the action of the spring and thus serve to further clamp the sleeve 9 firmly in position.

In order that the movement of the pipe 3 may not thereafter serve to loosen the clamping sleeve 9, the set screws 16 are then screwed tightly into position holding the sections of the clamping sleeve 9 against accidental movement by the pipe.

I have thus provided a coupling means which is automatic in its action. It may, because it is divided longitudinally, be expanded or contracted in diameter and yet, because of the manner in which the division line 13 is staggered or offset at 14, no leakage is possible longitudinally of the sleeve. Furthermore I provide an arrangement by means of which the oil or gas is inclosed in the chamber 6 and an increase of pressure on the fluid will only increase the force with which the joint is held tight.

This joint has a wide use and is adapted not only for the purpose set forth but may be used to make connections in steam or water pipes and in numerous other positions where it is impossible or extremely difficult to make the connection in the usual manner because of the force with which the fluid is flowing therein.

Having thus described my invention, the further objects and advantages of which will be obvious, what I claim as new and desire to protect by Letters Patent is:

1. An automatic coupling for pipe comprising a coupling sleeve the inner diameter of which is smaller toward one end thereof and an expansible clamping sleeve adapted to fit within the reduced end of said coupling sleeve, said clamping sleeve being divided longitudinally into a plurality of parts, the line of division between said parts being offset at right angles intermediate the ends of said clamping sleeve, the right angular portions being continually in contact.

2. An automatic coupling comprising a connecting sleeve, a channel through said sleeve tapering inwardly toward the lower end, a clamping sleeve adapted to fit within said tapered portion, said clamping sleeve being wedge shaped in cross-section and divided longitudinally into a plurality of parts and means to secure said clamping sleeve against movement.

3. An automatic pipe coupling comprising a coupling sleeve, the interior diameter thereof being tapered inwardly toward the lower end, as expansible clamping sleeve in said tapered portion, said sleeve being adapted to be pressed resiliently toward said tapered end and means to make a fluid tight joint when said sleeve is expanded, and toothed jaws to hold said clamping sleeve against a coöperating pipe.

4. An automatic pipe coupling comprising a connecting sleeve, the inner walls of which are tapered inwardly toward the lower end, a clamping sleeve shaped to fit therein and having an interior gripping face of uniform diameter, said clamping sleeve divided longitudinally in such manner as to preserve a fluid-tight joint with the pipe operated on, and means to lock said clamping sleeve in position.

In testimony whereof, I hereunto affix my signature this the 12 day of December, A. D. 1918.

WM. L. CHILDS.